US012684326B2

(12) United States Patent
Musgrove et al.

(10) Patent No.: US 12,684,326 B2
(45) Date of Patent: Jul. 14, 2026

(54) ADAPTIVE USER-CONTROLLABLE WIRELESS EMERGENCY ALERT PRESENTATION

(71) Applicant: AT&T Intellectual Property I, L.P., Atlanta, GA (US)

(72) Inventors: Charles Peter Musgrove, Henderson, NV (US); Brian Daly, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 447 days.

(21) Appl. No.: 18/089,917

(22) Filed: Dec. 28, 2022

(65) Prior Publication Data

US 2024/0224016 A1 Jul. 4, 2024

(51) Int. Cl.
*H04W 4/90* (2018.01)
*G06F 3/0484* (2022.01)

(52) U.S. Cl.
CPC ............ *H04W 4/90* (2018.02); *G06F 3/0484* (2013.01)

(58) Field of Classification Search
CPC ............................... H04W 4/90; G06F 3/0484
See application file for complete search history.

(56) References Cited

U.S. PATENT DOCUMENTS

| | | | |
|---|---|---|---|
| 10,681,522 B1 * | 6/2020 | Shintani | G08B 25/14 |
| 11,647,110 B2 * | 5/2023 | Youst | H04M 1/72448 |
| | | | 455/414.1 |

* cited by examiner

*Primary Examiner* — Marcos L Torres
(74) *Attorney, Agent, or Firm* — Hartman & Citrin LLC

(57) ABSTRACT

Concepts and technologies disclosed herein are directed to adaptive user-controllable wireless event alert ("WEA") presentation. According to one aspect disclosed herein, a WEA-capable device can execute a WEA application to present a user interface through which a user defines a WEA alert setting. The WEA alert setting can change how the WEA is presented to the user. The WEA-capable device can receive the WEA and can present the WEA to the user in accordance with the WEA setting. The WEA setting can be based upon a time, a type of the WEA, a sensor output, or some combination thereof.

20 Claims, 7 Drawing Sheets

200

START

202

WEA-CAPABLE DEVICE PRESENTS, VIA WEA APPLICATION, USER INTERFACE THROUGH WHICH USER DEFINES WEA SETTING; WEA SETTING CHANGES HOW WEA IS PRESENTED TO USER

204

WEA-CAPABLE DEVICE RECEIVES WEA

206

WEA-CAPABLE DEVICE PRESENTS WEA IN ACCORDANCE WITH WEA SETTING

208

END

300

ADAPTIVE USER-CONTROLLABLE WIRELESS EMERGENCY ALERT PRESENTATION

BACKGROUND

In the United States, the Wireless Emergency Alert ("WEA") system delivers critical warnings and public safety information to the public on mobile devices. Participation by Commercial Mobile Service Providers ("CMSPs") is voluntary, but most CMSPs support WEAs. Participating CMSPs adhere to technical and operational requirements established by the Federal Communications Commission ("FCC").

Authorized alert originators, such as federal, state, or local emergency management agencies, send WEAs through the Integrated Public Alert and Warning System ("IPAWS") to participating CMSPs, which then broadcast the WEAs from cellular towers to mobile devices in affected areas. WEAs are sent using Short Message Service Cell Broadcast ("SMS-CB"), which is a one-to-many service that simultaneously delivers messages to multiple recipients in a specified area. By using SMS-CB, WEAs avoid the congestion issues experienced by traditional voice and text messaging (e.g., SMS Point-to-Point) alerting services, which translates into faster and more comprehensive delivery of messages during times of emergency.

With the current WEA system, users are not allowed to choose to opt-out of message types by time-of-day or by the state of their current environment (e.g., dark or not moving). This means that WEA users may be awakened in the night from WEA alerts, some of which may be useful (e.g., earthquake, tornado, or other natural disaster), and some of which may not be useful at all to them or others at that particular time (e.g. AMBER alerts). AMBER alerts are useful to allow public safety and law enforcement officials to seek help from the public, but it is not usually helpful for people to receive these types of alerts during sleeping hours. Being bothered by receiving these alerts in the middle of the night may result in some people opting out of all WEA alerts other than National Alerts that cannot be turned off.

SUMMARY

Concepts and technologies disclosed herein are directed to adaptive user-controllable WEA presentation. According to one aspect disclosed herein, a WEA-capable device can present, via a WEA-capable device, a user interface through which a user defines a WEA setting. The WEA setting can change how the WEA is presented to the user. The WEA-capable device can receive the WEA and can present the WEA to the user in accordance with the WEA setting.

In some embodiments, the WEA setting changes how the WEA is presented to the user based upon a time. For example, the user can choose not to receive any WEAs during certain times of the day (e.g., 11 PM through 6 AM local time). In some embodiments, the WEA setting changes how the WEA is presented to the user based upon a WEA type. In some embodiments, the WEA setting changes how the WEA is presented to the user based upon a sensor output from a sensor of the WEA-capable device. The sensor output can be, for example, a light level value from a light sensor or a motion value from a motion sensor. The WEA setting can change how the WEA is presented based upon any combination of a time, a WEA type, and/or a sensor output.

In some embodiments, the WEA setting is selected from a plurality of pre-defined emergency alert settings. Each of the plurality of pre-defined emergency alert settings can include a percentage reduction of a volume setting, a percentage reduction of an intensity of vibration setting, or a percentage reduction of both a volume setting and an intensity of vibration setting.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
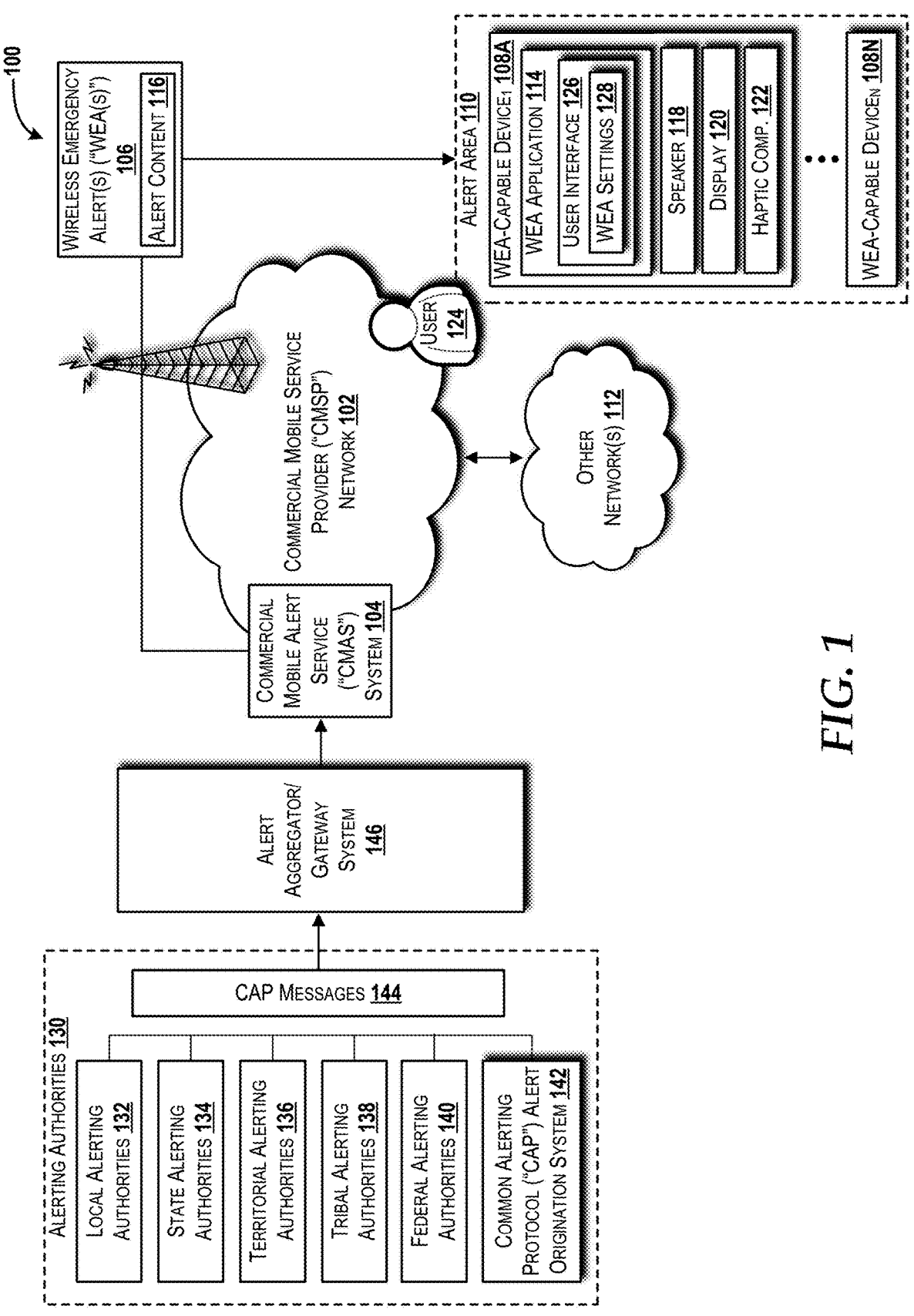
FIG. 1 is a block diagram illustrating aspects of an illustrative operating environment in which the concepts and technologies disclosed herein can be implemented.

The concepts and technologies disclosed herein are directed to adaptive user-controllable WEA presentation. The concepts and technologies disclosed herein provide flexibility for users to decide when they do not want to receive certain types of WEA alerts. For example, a user may not want to receive an AMBER alert in the middle of the night. Many users will turn off WEA alerts altogether (with the exception of National Alerts that cannot be turned off) if they are bothered by WEA alerts and do not perceive WEA alerts as being useful or pertinent to them. The flexibility of the concepts and technologies disclosed herein allows users to choose not to receive WEA alerts based upon the time of day and/or based upon one or more sensor readings (e.g., light sensor, velocity sensor, and/or other sensors).

Some benefits of the concepts and technologies disclosed herein are to reduce the intrusiveness of the receipt of certain types of WEA alerts for users that they deem ahead of time (e.g., when WEA settings are set up) to be less important or less priority for them. In this manner, users can enjoy more flexibility than they have today to pick the types of WEA alerts they want for "soft presentation" based on the time of day or circumstances sensed by the phone (e.g., dark, zero velocity, and/or the like). Although the concepts and technologies described herein are primarily directed to AMBER alerts as an example, the concepts and technologies disclosed herein can be used for "soft presentation" of WEA alerts associated with different types of alert events.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of concepts and technologies for adaptive user-controllable event level WEA opt-out and soft presentation will be described.

Referring now to FIG. 1, an illustrative operating environment 100 in which the concepts and technologies disclosed herein can be implemented will be described. The operating environment 100 includes a commercial mobile service provider ("CMSP") network 102 that supports a commercial mobile alert service ("CMAS") via a CMAS system 104. In particular, the CMSP network 102 can provide wireless emergency alerts ("WEAs") 106 (hereafter referred to individually as "WEA 106" or collectively as "WEAs 106") to a plurality of WEA-capable devices 108A-108N (hereafter referred to individually as "WEA-capable device 108" or collectively as "WEA-capable devices 108") operating within an alert area 110. The alert area 110 can be or can include a geographical location that is affected by an emergency event, such as a real-world disaster and/or a crisis. For example, the emergency event can be or can include a hurricane, a tsunami, an earthquake, a tornado, a blizzard, a wildfire, a landslide, another natural disaster, a disease epidemic, an active shooter situation, a terrorist attack, and the like. The alert area 110 also can include a geographical location that is proximate to the emergency event (e.g., a nearby city).

The CMSP network 102 can include one or more radio access networks ("RANs;" not shown), each of which can include one or more cell sites having the same or different cell sizes, which may be represented by different cell-types. As used herein, a "cell" or "cell site" refers to a geographical area that is served by one or more base stations operating within an access network. In the illustrated example, the alert area 110 can include one or more cells, each of which can include a base station, such as an Evolved Node Base eNodeB ("eNB"), an mmWave Next Generation Node Base ("gNB"), or a combination eNB/gNB. The RAN(s) and associated base station(s) can be configured in accordance with one or more 3GPP technical specifications for next generation ("5G") RAN architecture, combined 4G/5G RAN architecture, legacy technologies, revisions thereof, combinations thereof, and/or the like.

The CMSP network 102 can operate in accordance with one or more mobile telecommunications standards including, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other current 3GPP cellular technologies, other future 3GPP cellular technologies, 5G New Radio ("NR"), combinations thereof, and/or the like. The CMSP network 102 can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide a radio/air interface to the plurality of WEA-capable devices 108A-108N. Data communications can be provided in part by the CMSP network 102 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, the RAN may be a GSM RAN ("GRAN"), a GSM EDGE RAN ("GERAN"), a UMTS Terrestrial Radio Access Network ("UTRAN"), an evolved U-TRAN ("E-UTRAN"), Next Generation RAN ("NG-RAN"), any combination thereof, and/or the like. In some embodiments, the RAN is or includes one or more virtual RANs ("vRANs").

The CMSP network 102 also can include one or more core networks, such as an Evolved Packet Core ("EPC") network and a 5G Core Network. The CMSP network 102 is, in turn, in communication with one or more other networks 112 such as one or more other public land mobile networks ("PLMNs"), one or more Public Switched Telephone Networks ("PSTNs") one or more packet data networks ("PDNs") (e.g., the Internet), one or more emergency networks, other packet switched networks, other circuit switched networks, combinations thereof, and/or the like.

The alert area 110 can encompass one or more cells. The cells within the alert area 110 can include the same or different cell sizes, which may be represented by different cell-types. A cell-type can be associated with certain dimensional characteristics that define the effective radio range of a cell. Cell-types can include, but are not limited to, a macro cell-type, a metro cell-type, a femto cell-type, a pico cell-type, a micro cell-type, wireless local area network ("WLAN") cell-type, and a white space network cell-type. A "small cell" cell-type is utilized herein to collectively refer to a group of cell-types that includes femto cell-type, pico cell-type, and micro cell-type, in general contrast to a macro cell-type, which offers a larger coverage area. Other cell-types, including proprietary cell-types and temporary cell-types are also contemplated.

The CMSP network 102 can be implemented, at least in part, as physical network functions ("PNFs") having hardware and software components. The CMSP network 102 can additionally or alternatively be implemented, at least in part, by virtual network functions ("VNFs"). For example, the core network components can be realized as VNFs that utilize a unified commercial-off-the-shelf ("COTS") hardware and flexible resources shared model with the application software for the respective core network components running on one or more virtual machines ("VMs"). Moreover, the core network components can be embodied as VNFs in one or more VNF pools, each of which can include a plurality of VNFs providing a particular core network function. An example virtualized cloud architecture 600 upon which the CMSP network 102 can be deployed is illustrated and described herein with reference to FIG. 6.

Figure 3:
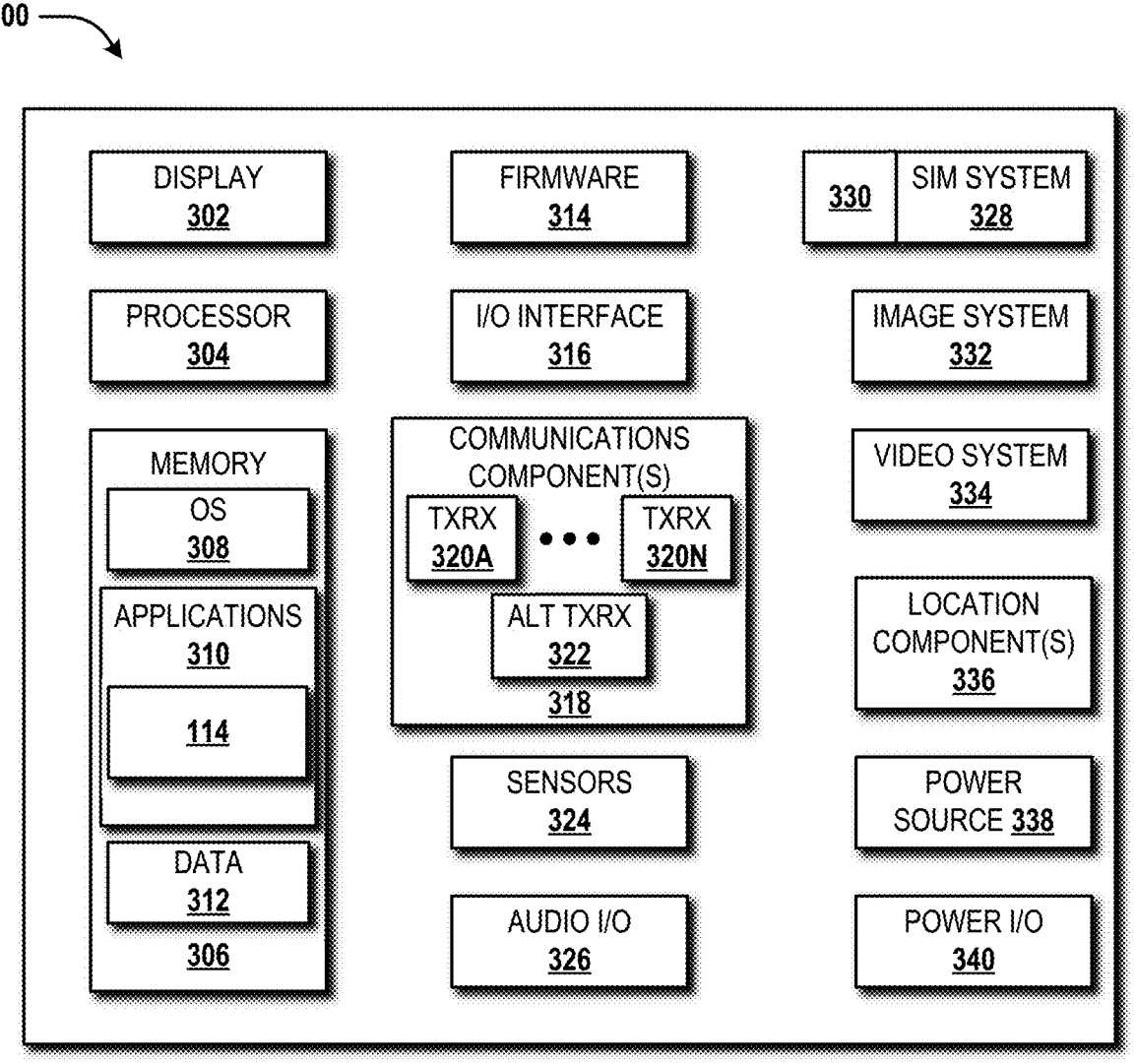
FIG. 3 is a block diagram illustrating an example mobile device, according to an illustrative embodiment.

The WEA-capable device 108 can be a cellular phone, a feature phone, a smartphone, a mobile computing device, a tablet computing device, a portable video game console, or any other computing device that includes one or more radio access components that are capable of connecting to and communicating with one or more RANs via one or more radio access components. Moreover, the WEA-capable device 108 can include a WEA application 114. In some embodiments, the WEA application 114 is implemented as part of an operating system of the WEA-capable device 108. An example operating system 308 is best shown in FIG. 3. In other embodiments, the WEA application 114 is a stand-alone application that provides WEA functionality.

The WEA application 114 can receive the WEA 106 from the CMAS system 104. The WEA 106 can include alert content 116. The alert content 116 includes information that provides details about one or more events.

The alert content 116 can be or can include an AMBER alert message that provides information about a child abduction. For example, an AMBER alert can include information about the name, age, physical attributes (e.g., hair color, height, and weight), and clothing description (e.g., t-shirt and jeans) of the victim. The AMBER alert also can include information about the alleged abductor, such as physical attributes and/or vehicle description (if applicable).

The alert content 116 can be or can include a non-emergency message that provides updated information about an event in progress, an event that has expired or concluded early, pre-event preparation or mitigation activities, post-event recovery operations, or other administrative matters pertaining to the CMAS.

The alert content 116 can be or can include an Avalanche Watch ("AVA"), which is an emergency message indicating that conditions are favorable or expected for an avalanche but not imminent or occurring. The purpose of an avalanche watch is to warn the public that avalanche warning criteria are likely to be met in 24-48 hours. The alert content 116 can be or can include an Avalanche Warning ("AVW"), which is an emergency message indicating conditions are imminent or occurring.

The alert content 116 can be or can include a Blue Alert ("BLU"), which is a message issued by state and local authorities to warn the public when there is actionable information related to a law enforcement officer who is missing, seriously injured or killed in the line of duty, or when there is an imminent, credible threat to an officer. A Blue Alert could quickly warn the public if a violent suspect may be in a community, along with providing instructions on what to do if the suspect is spotted and how to stay safe.

The alert content 116 can be or can include a Civil Danger Warning ("CDW"), which is an emergency warning message of an event that presents a danger to a significant civilian population. The CDW, which usually warns of a specific hazard and gives specific protective action, has a higher priority than the Local Area Emergency ("LAE").

Examples include contaminated water supply and imminent or in-progress military or terrorist attack. Public protective actions could include evacuation, shelter in place or other actions (such as boiling contaminated water or seeking medical treatment).

The alert content 116 can be or can include a Civil Emergency Message ("CEM"), which is an emergency message regarding an in-progress or imminent significant threat(s) to public safety and/or property. The CEM is a higher priority message than the LAE, but the hazard is less specific than the CDW. For example, the CEM could be used to describe a change in the Homeland Security Alert System level in response to a terrorist threat.

The alert content 116 can be or can include a Practice/Demo Warning ("DMO"), which is a demonstration or test message used for particular purposes as established in state, local, tribal, or territorial emergency alert system "EAS" plans. Purposes may include testing of a siren system or audio quality checks.

The alert content 116 can be or can include an Earthquake Warning ("EQW"), which is a warning of current or imminent earthquake activity. Authorized officials may recommend or order protective actions according to state law or local ordinance.

The alert content 116 can be or can include an Immediate Evacuation ("EVI"), which is a warning where immediate evacuation is recommended or ordered according to state law or local, tribal, or territorial ordinance. As an example, authorized officials may recommend the evacuation of affected areas due to an approaching tropical cyclone. In the event a flammable or explosive gas is released, authorized officials may recommend evacuation of designated areas where casualties or property damage from a vapor cloud explosion or fire may occur.

The alert content 116 can be or can include a Fire Warning ("FRW"), which is a warning of a spreading wildfire or structure fire that threatens a populated area. Evacuation of areas in the fire's path may be recommended by authorized officials according to state law or local ordinance.

The alert content 116 can be or can include a Hazardous Materials Warning ("HMW"), which is a warning of a release of non-radioactive hazardous material (e.g., a flammable gas, toxic chemical, or biological agent) that may recommend evacuation (e.g., for an explosion, fire, or oil spill hazard) or shelter in place (e.g., for a toxic fume hazard).

The alert content 116 can be or can include a LAE, which is an emergency message that defines an event that by itself does not pose a significant threat to public safety and/or property. However, the event could escalate, contribute to other more serious events, or disrupt critical public safety services. Instructions, other than public protective actions, may be provided by authorized officials. Examples include a disruption in water, electric or natural gas service, road closures due to excessive snowfall, or a potential terrorist threat where the public is asked to remain alert.

The alert content 116 can be or can include a Law Enforcement Warning ("LEW"), which is a warning of a bomb explosion, riot or other criminal event (e.g., a jailbreak). An authorized law enforcement agency may blockade roads, waterways or facilities, evacuate or deny access to affected areas, and arrest violators or suspicious persons.

The alert content 116 can be or can include a Nuclear Power Plant Warning ("NUW"), which is a warning of an event at a nuclear power plant, classified as a Site Area Emergency or General Emergency as classified by the Nuclear Regulatory Commission ("NRC"). A Site Area Emergency is confined to the plant site; no offsite impact is expected. Typically, a General Emergency is confined to an area less than a 10-mile radius around the plant. Authorized officials may recommend evacuation or medical treatment of exposed persons in nearby areas.

The alert content 116 can be or can include a Radiological Hazard Warning ("RHW"), which is a warning of the loss, discovery or release of a radiological material. Examples include the theft of a radioactive isotope used for medical, seismic, or other purposes; the discovery of radioactive materials; and a transportation (e.g., aircraft, truck or rail, etc.) accident that may involve nuclear weapons, nuclear fuel, or radioactive wastes. Authorized officials may recommend protective actions to be taken if a radioactive hazard is discovered.

The alert content 116 can be or can include a Required Monthly Test ("RMT"), which is a test message that is typically pre-scheduled and coordinated state- or region-wide on an annual basis. RMTs are generally originated by a pre-designated local or state primary station, or a state emergency management agency. RMTs must be relayed by broadcast stations and cable channels. RMTs must be performed between 8:30 a.m. and local sunset during odd numbered months, and between local sunset and 8:30 a.m. during even numbered months. Received monthly tests must be retransmitted within 60 minutes of receipt. Additionally, an RMT should not be scheduled or conducted during an event of great importance such as a pre-announced Presidential speech, coverage of a national/local election, major local or national news coverage outside regularly scheduled newscast hours, or a major national sporting event such as the Super Bowl or World Series, with other events such as the Indianapolis 500 and Olympic Games mentioned in individual EAS state plans.

The alert content 116 can be or can include a Required Weekly Test ("RWT"), which is a test message that consists, at a minimum, of the header and end-of-message tones. Though an RWT does not need an audio or graphic message announcing the test, many stations provide them as a courtesy to the public. In addition, television stations are not required to transmit a video message for weekly tests. RWTs are scheduled by the station on random days and times during weeks when there is no Required Monthly Test scheduled. Broadcast and cable operators generally do not relay incoming RWTs. EAS RWTs may be originated by state and local alerting authorities to confirm the operational status of their IPAWS Live alerting software configuration without fear of interrupting broadcast or cable programming.

The alert content 116 can be or can include a Shelter in Place Warning ("SPW"), which is a warning of an event where the public is recommended to shelter in place (e.g., go inside, close doors and windows, turn off air conditioning or heating systems, and turn on the radio or TV for more information). An example is the release of hazardous materials where toxic fumes or radioactivity may affect designated areas.

The alert content 116 can be or can include a 911 Telephone Outage Emergency ("TOE"), which is an emergency message that defines a local or state 911 telephone network outage by geographic area or telephone exchange. Authorized officials may provide alternate phone numbers with which to reach 911 or dispatch personnel.

The alert content 116 can be or can include a Volcano Warning ("VOW"), which is a warning of current or imminent volcanic activity. Authorized officials may recommend or order protective actions according to state law or local ordinance.

The illustrated WEA-capable device 108 also includes a speaker 118, a display 120, and a haptic component 122. The speaker 118, the display 120, the haptic component 122, or some combination thereof, can be used to notify a user 124 of the WEA(s) 106. The speaker 118 can be a built-in speaker or an external speaker (e.g., headphones) connected to the WEA-capable device 108 via a wireless (e.g., BLUETOOTH) or wired (e.g., headphone jack) connection. The speaker 118 can playback a sound associated with the WEA(s) 106. The display 120 can be a primary display built-in to the WEA-capable device 108 and/or a secondary display connected to the WEA-capable device 108. The display 120 can present text and/or other visual elements associated with the WEAs 106. In some embodiments, the display 120 is an external display such as a monitor. The display 120 may be part of another device that is in communication with the WEA-capable device 108. For example, the display 120 may be part of a smartwatch that is configured to present WEAs 106 received by the WEA-capable device 108. The haptic component 122 can be any component that is capable of conveying information (e.g., associated with the WEA 106) to the user 124 through the user's 124 sense of touch, such as via haptic feedback. The haptic component 122 can provide force feedback, vibrotactile feedback, electrotactile feedback, thermal feedback, a combination thereof, and/or the like.

The WEA application 114 can provide a user interface 126 through which the user 124 can define in what circumstances the user 124 wants to receive certain types of WEAs 106. For example, the user 124 can choose not to receive AMBER alerts during certain times of the day (e.g., 11 PM through 6 AM local time). Alternatively, the user 124 can choose not to receive AMBER alerts when the WEA-capable device 108 senses darkness (e.g., via a light sensor) and/or when the WEA-capable device 108 senses zero velocity (e.g., at night when the WEA-capable device 108 is stationary, such as on a nightstand). When the WEA-capable device 108 senses darkness but velocity is greater than zero, then the WEA application 114 may determine that the user 124 is riding in a vehicle at night, in which case receipt of the WEAs 106 (e.g., AMBER alert) would still be useful to the user 124 and to the agency that sent the AMBER alert because the user 124 can still be the "eyes and ears" of the agency to be on the lookout for a vehicle with a certain license plate. When the user 124 is at home sleeping, AMBER alerts are of very minimal use. The WEA application 114 can still have the WEA(s) 106 available for viewing by the user 124 at any time (e.g., in the middle of the night), just without the WEA tone and vibration cadence being used as with normal WEA alert presentation.

The user 124 can define WEA settings 128 on the WEA-capable device 108 via the user interface 126. The WEA settings 128 can define when the user 124 would want to receive the WEA alert(s) 106 via "soft presentation" and for which types of WEA alert(s) 106. A "soft presentation" is used herein to describe presentation of the WEA(s) 106 without any sound or vibration or at a reduced volume of sound and/or reduced intensity of vibration. In some embodiments, the WEA settings 128 can include multiple tiers of soft presentation such as "soft," "softer," and "softest." For example, "soft" could be reduced volume and reduced vibration intensity (e.g., 50% reduction); "softer" could be further reduced volume and further reduced vibration intensity (e.g., 75% reduction); and "softest" could be volume and vibration intensity reduced to zero (i.e., 100% reduction). These settings can be associated with specific days (e.g., Monday through Friday), specific times (e.g., 11 PM through 6 AM), and/or specific sensor readings.

Using the WEA settings 128, such as those described above, enables the user 124 to reduce the intrusiveness of the receipt of all or certain types of WEA(s) 106 that the user 124 deems ahead of time (i.e., at the time the user 124 establishes the WEA settings) to be of less importance or of less priority for the user 124. This allows the user 124 more flexibility than available today to pick the types of alerts the user 124 wants for "soft presentation" based on the time of day and/or other circumstances sensed by the WEA-capable device 108 (e.g., dark and/or zero velocity).

The WEAs 106 can originate from one or more alerting authorities 130. In general, the alerting authorities 130 can be one or more local alerting authorities 132, one or more state alerting authorities 134, one or more territorial alerting authorities 136, one or more tribal alerting authorities 138, one or more federal alerting authorities 140, or some combination thereof. Each of the alerting authorities 130 can utilize a common alerting protocol ("CAP") alert origination system 142 to create one or more CAP messages 144 to be sent to an alert aggregator/gateway system 146. CAP is a standardized digital format for exchanging emergency alerts. CAP allows a consistent alert message to be disseminated simultaneously over multiple communications pathways. The alert aggregator/gateway system 146 can receive the CAP messages 144 from the alerting authorities 130 and route the CAP messages 144 to various alerting disseminators. In the illustrated example, the alert aggregator/gateway system 146 routes the CAP messages 144 to the CMAS system 104. In real-world implementations, however, the alert aggregator/gateway system 146 can route the CAP messages 144 to other alerting disseminators, such as EAS for radio and television, Internet services for web browsers, widgets, web sites, and social media, NOAA, state/local unique alerting systems, digital signage, and other future alerting technologies.

Figure 2:
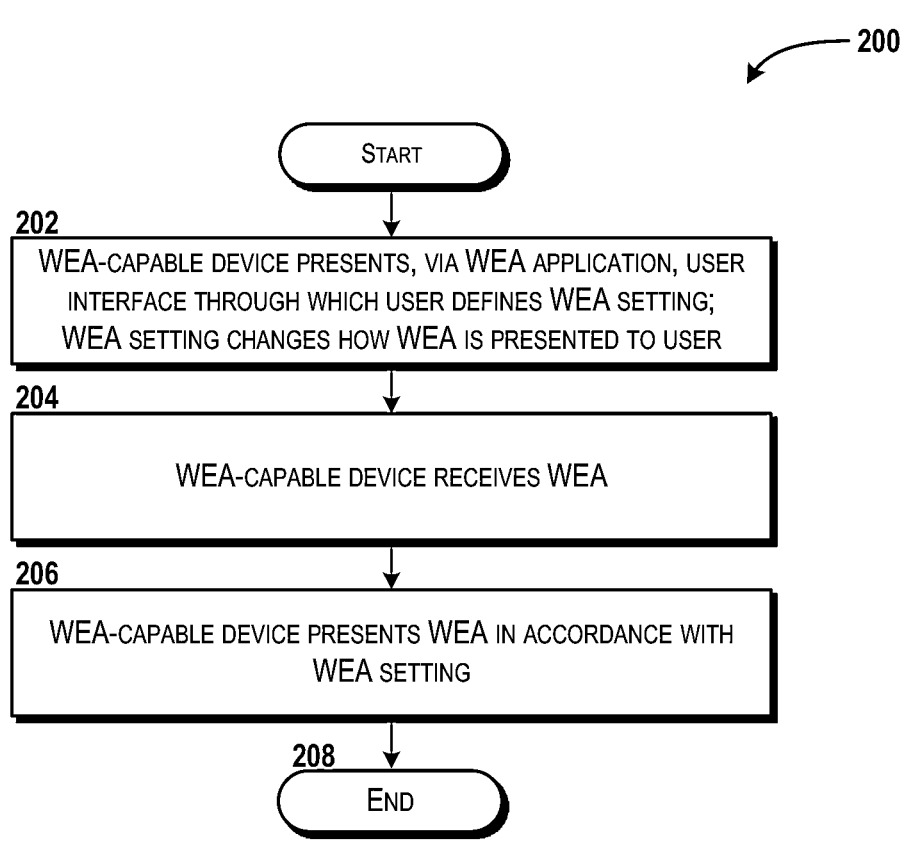
FIG. 2 is a flow diagram illustrating a method for adaptive user-controllable WEA presentation, according to an illustrated embodiment.

Turning now to FIG. 2, a flow diagram illustrating a method 200 for adaptive user-controllable WEA presentation will be described, according to an illustrated embodiment. It should be understood that the operations of the method disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the method disclosed herein can be ended at any time and need not be performed in its entirety. Some or all operations of the method, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors disclosed herein to perform operations.

The method 200 begins and proceeds to operation 202. At operation 202, the WEA-capable device 108 presents, via the WEA application 114, the user interface 126 through which the user 124 defines the WEA settings 128. For example, the user 124 can choose not to receive AMBER alerts during certain times of the day (e.g., 11 PM through 6 AM local time). Alternatively, the user 124 can choose not to receive AMBER alerts when the WEA-capable device 108 senses darkness (e.g., via a light sensor) and/or when the WEA-capable device 108 senses zero movement (e.g., at night when the WEA-capable device 108 is stationary, such as on a nightstand). When the WEA-capable device 108 senses darkness but velocity is greater than zero, then the WEA application 114 may determine that the user 124 is riding in a vehicle at night, in which case receipt of the WEAs 106 (e.g., AMBER alert) would still be useful to the user 124 and to the agency that sent the AMBER alert because the user 124 can still be the "eyes and ears" of the agency to be on the lookout for a vehicle with a certain license plate. When the user 124 is at home sleeping, AMBER alerts are of minimal use. The WEA application 114 can still have the WEA(s) 106 available for viewing by the user 124 at any time (e.g., in the middle of the night), just without the WEA tone and vibration cadence being used as with normal WEA alert presentation. The user 124 can define WEA settings 128 on the WEA-capable device 108 via the user interface 126. The WEA settings 128 can define when the user 124 would want to receive the WEA alert(s) 106 via "soft presentation" and for which types of WEA alert(s) 106. A "soft presentation" is used herein to describe presentation of the WEA(s) 106 without any sound or vibration or at a reduced volume of sound and/or reduced intensity of vibration. In some embodiments, the WEA settings 128 can include multiple tiers of soft presentation such as "soft," "softer," and "softest." For example, "soft" could be reduced volume and reduced vibration intensity (e.g., 50% reduction); "softer" could be further reduced volume and further reduced vibration intensity (e.g., 75% reduction); and "softest" could be volume and vibration intensity reduced to zero (i.e., 100% reduction). These settings can be associated with specific days (e.g., Monday through Friday), specific times (e.g., 11 PM through 6 AM), and/or specific sensor readings. Using the WEA settings 128, such as those described above, enable the user 124 to reduce the intrusiveness of the receipt of all or certain types of WEA(s) 106 that the user 124 deems ahead of time (i.e., at the time the user 124 establishes the WEA settings) to be of less importance or of less priority for the user 124. This allows the user 124 more flexibility than available today to pick the types of alerts the user 124 wants for "soft presentation" based on the time of day and/or other circumstances sensed by the WEA-capable device 108 (e.g., dark and/or zero velocity).

From operation 202, the method 200 proceeds to operation 204. At operation 204, the WEA-capable device 108 receives a WEA 106. From operation 204, the method 200 proceeds to operation 206. At operation 206, the WEA-capable device 108 presents the WEA 106 in accordance with the WEA settings 128. In some embodiments, in response to receiving the WEA 106, the WEA application 114 can check a current time and one or more sensor outputs (e.g., motion sensor and/or light sensor) to determine whether to present the WEA 106 via a normal, soft, softer, or softest presentation. From operation 206, the method 200 proceeds to operation 208. At operation 208, the method 200 can end.

Turning now to FIG. 3, an illustrative mobile device 300 and components thereof will be described. In some embodiments, the WEA-capable device 108 described above with reference to FIG. 1 can be configured as and/or can have an architecture similar or identical to the mobile device 300 described herein in FIG. 3. It should be understood, however, that the WEA-capable device 108 may or may not include the functionality described herein with reference to FIG. 3. While connections are not shown between the various components illustrated in FIG. 3, it should be understood that some, none, or all of the components illustrated in FIG. 3 can be configured to interact with one another to carry out various device functions. In some embodiments, the components are arranged so as to communicate via one or more busses (not shown). Thus, it should be understood that FIG. 3 and the following description are intended to provide a general understanding of a suitable environment in which various aspects of embodiments can be implemented, and should not be construed as being limiting in any way.

As illustrated in FIG. 3, the mobile device 300 can include a display 302 (e.g., the display 120) for displaying data such as the alert content 116. According to various embodiments, the display 302 can be configured to display network connection information, various GUI elements, text, images, video, virtual keypads and/or keyboards, messaging data, notification messages, metadata, Internet content, device status, time, date, calendar data, device preferences, map and location data, combinations thereof, and/or the like. The mobile device 300 also can include a processor 304 and a memory or other data storage device ("memory") 306. The processor 304 can be configured to process data and/or can execute computer-executable instructions stored in the memory 306. The computer-executable instructions executed by the processor 304 can include, for example, an operating system 308, one or more applications 310, other computer-executable instructions stored in the memory 306, or the like. The operating system 308 can include the WEA application 114. Alternatively, the applications 310 can include the WEA application 114.

The UI application can interface with the operating system 308 to facilitate user interaction with functionality and/or data stored at the mobile device 300 and/or stored elsewhere. In some embodiments, the operating system 308 can include a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 304 to aid a user in data communications, entering/deleting data, entering and setting user IDs and passwords for device access, configuring settings, manipulating content and/or settings, multimode interaction, interacting with other applications 310, and otherwise facilitating user interaction with the operating system 308, the applications 310, and/or other types or instances of data 312 that can be stored at the mobile device 300.

The applications 310, the data 312, and/or portions thereof can be stored in the memory 306 and/or in a firmware 314, and can be executed by the processor 304. The firmware 314 also can store code for execution during device power up and power down operations. It can be appreciated that the firmware 314 can be stored in a volatile or non-volatile data storage device including, but not limited to, the memory 306 and/or a portion thereof.

The mobile device 300 also can include an input/output ("I/O") interface 316. The I/O interface 316 can be configured to support the input/output of data such as location information, presence status information, user IDs, passwords, and application initiation (start-up) requests. In some embodiments, the I/O interface 316 can include a hardware connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 300 can be configured to synchronize with another device to transfer content to and/or from the mobile device 300. In some embodiments, the mobile device 300 can be configured to receive updates to one or more of the applications 310 via the I/O interface 316, though this is not necessarily the case. In some embodiments, the I/O interface 316 accepts I/O devices such as the haptic component 122, keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 316 may be used for communications between the mobile device 300 and a network device or local device.

The mobile device 300 also can include a communications component 318. The communications component 318 can be configured to interface with the processor 304 to facilitate wired and/or wireless communications with one or more networks, such as the CMSP network 102 and/or the other network(s) 112. In some embodiments, the communications component 318 includes a multimode communications subsystem for facilitating communications via the cellular network and one or more other networks.

The communications component 318, in some embodiments, includes one or more transceivers. The one or more transceivers, if included, can be configured to communicate over the same and/or different wireless technology standards with respect to one another. For example, in some embodiments, one or more of the transceivers of the communications component 318 may be configured to communicate using GSM, CDMAONE, CDMA2000, UMTS, LTE, and various other 2G, 3G, 4G, 5G, 6G, and greater generation technology standards. Moreover, the communications component 318 may facilitate communications over various channel access methods (which may or may not be used by the aforementioned standards) including, but not limited to, TDMA, FDMA, W-CDMA, OFDM, SDMA, and the like.

In addition, the communications component 318 may facilitate data communications using GPRS, EDGE, the HSPA protocol family including HSDPA, EUL or otherwise termed HSUPA, HSPA+, and various other current and future wireless data access standards. In the illustrated embodiment, the communications component 318 can include a first transceiver ("TxRx") 320A that can operate in a first communications mode (e.g., GSM). The communications component 318 also can include an Nth transceiver ("TxRx") 320N that can operate in a second communications mode relative to the first transceiver 320A (e.g., UMTS). While two transceivers 320A-320N (hereinafter collectively and/or generically referred to as "transceivers 320") are shown in FIG. 3, it should be appreciated that less than two, two, and/or more than two transceivers 320 can be included in the communications component 318.

The communications component 318 also can include an alternative transceiver ("Alt TxRx") 322 for supporting other types and/or standards of communications. According to various contemplated embodiments, the alternative transceiver 322 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 318 also can facilitate reception from terrestrial radio networks, digital satellite radio networks, internet-based radio service networks, combinations thereof, and the like. The communications component 318 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 300 also can include one or more sensors 324. The sensors 324 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 300 may be provided by an audio I/O component 326. The audio I/O component 326 of the mobile device 300 can include one or more speakers (e.g., the speaker 118) for the output of audio signals, one or more microphones for the collection and/or input of audio signals, and/or other audio input and/or output devices.

The illustrated mobile device 300 also can include a subscriber identity module ("SIM") system 328. The SIM system 328 can include a universal SIM ("USIM"), a universal integrated circuit card ("UICC"), e-SIM, and/or other identity devices. The SIM system 328 can include and/or can be connected to or inserted into an interface such as a slot interface 330. In some embodiments, the slot interface 330 can be configured to accept insertion of other identity cards or modules for accessing various types of networks. Additionally, or alternatively, the slot interface 330 can be configured to accept multiple subscriber identity cards. Because other devices and/or modules for identifying users and/or the mobile device 300 are contemplated, it should be understood that these embodiments are illustrative, and should not be construed as being limiting in any way.

The mobile device 300 also can include an image capture and processing system 332 ("image system"). The image system 332 can be configured to capture or otherwise obtain photos, videos, and/or other visual information. As such, the image system 332 can include cameras, lenses, charge-coupled devices ("CCDs"), combinations thereof, or the like. The mobile device 300 may also include a video system 334. The video system 334 can be configured to capture, process, record, modify, and/or store video content. Photos and videos obtained using the image system 332 and the video system 334, respectively, may be added as message content to an MMS message, email message, and sent to another device. The video and/or photo content also can be shared with other devices via various types of data transfers via wired and/or wireless communication devices as described herein.

The mobile device 300 also can include one or more location components 336. The location components 336 can be configured to send and/or receive signals to determine a geographic location of the mobile device 300. According to various embodiments, the location components 336 can send and/or receive signals from global positioning system ("GPS") devices, assisted-GPS ("A-GPS") devices, WI-FI/WIMAX and/or cellular network triangulation data, combinations thereof, and the like. The location component 336 also can be configured to communicate with the communications component 318 to retrieve triangulation data for determining a location of the mobile device 300. In some embodiments, the location component 336 can interface with cellular network nodes, telephone lines, satellites, location transmitters and/or beacons, wireless network transmitters and receivers, combinations thereof, and the like. In some embodiments, the location component 336 can include and/or can communicate with one or more of the sensors 324 such as a compass, an accelerometer, and/or a gyroscope to determine the orientation of the mobile device 300. Using the location component 336, the mobile device 300 can generate and/or receive data to identify its geographic location, or to transmit data used by other devices to determine the location of the mobile device 300. The location component 336 may include multiple components for determining the location and/or orientation of the mobile device 300.

The illustrated mobile device 300 also can include a power source 338. The power source 338 can include one or more batteries, power supplies, power cells, and/or other power subsystems including alternating current ("AC") and/or direct current ("DC") power devices. The power source 338 also can interface with an external power system or charging equipment via a power I/O component 340. Because the mobile device 300 can include additional and/or alternative components, the above embodiment should be understood as being illustrative of one possible operating environment for various embodiments of the concepts and technologies described herein. The described embodiment of the mobile device 300 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 300 or other devices or computers described herein, such as the computer system 400 described below with reference to FIG. 4. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 300 in order to store and execute the software components presented herein. It is also contemplated that the mobile device 300 may not include all of the components shown in FIG. 3, may include other components that are not explicitly shown in FIG. 3, or may utilize an architecture completely different than that shown in FIG. 3.

Figure 4:
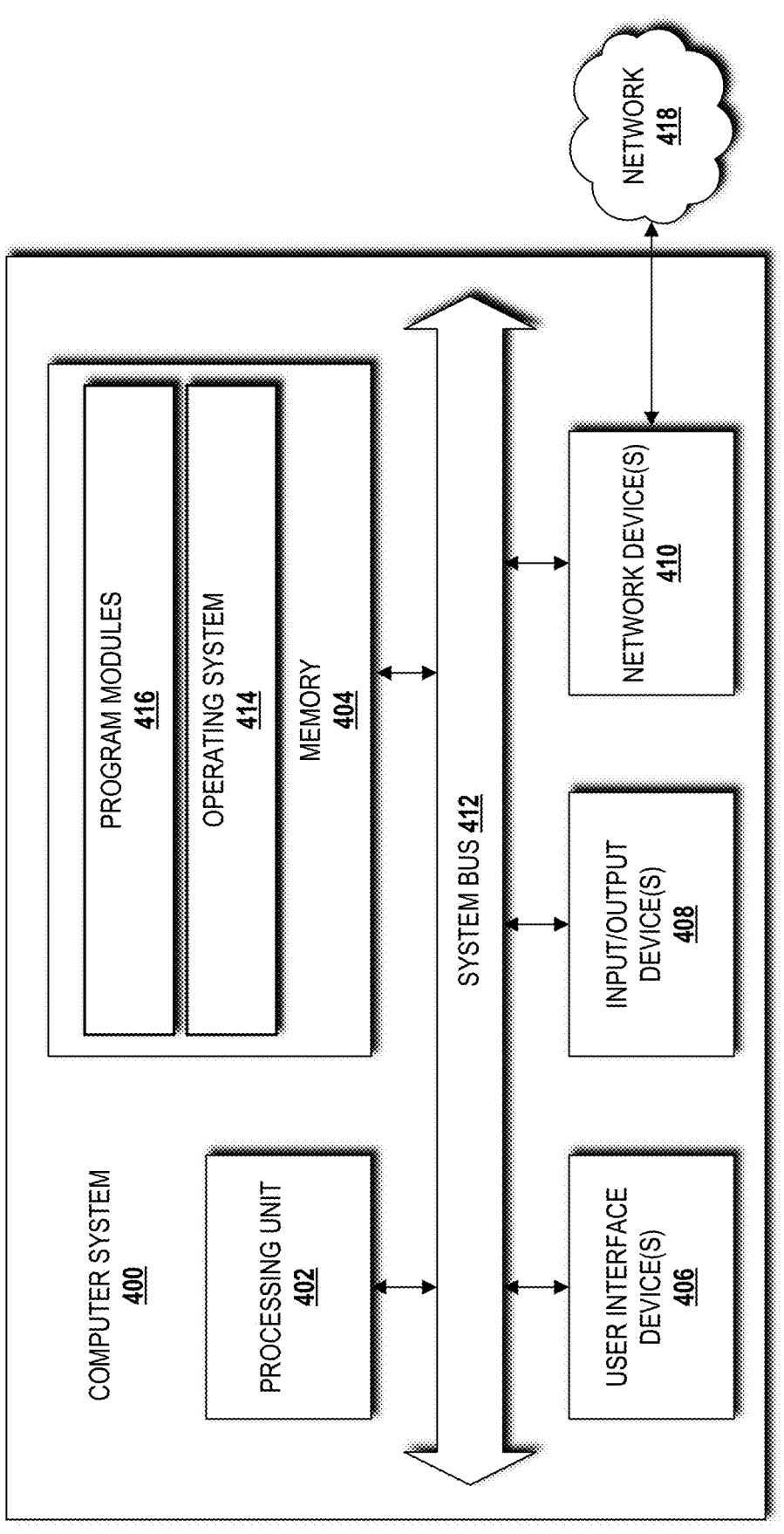
FIG. 4 is a block diagram illustrating an example computer system capable of implementing aspects of the embodiments presented herein.

Turning now to FIG. 4 is a block diagram illustrating a computer system 400 configured to provide the functionality in accordance with various embodiments of the concepts and technologies disclosed herein. The systems, devices, and other components disclosed herein, such as the alert aggregator/gateway system 146, the CAP alert origination system 142, and/or the CMAS system 104, can be implemented, at least in part, using an architecture that is the same as or similar to the architecture of the computer system 400. It should be understood, however, that modification to the architecture may be made to facilitate certain interactions among elements described herein.

The computer system 400 includes a processing unit 402, a memory 404, one or more user interface devices 406, one or more input/output ("I/O") devices 408, and one or more network devices 410, each of which is operatively connected to a system bus 412. The bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The illustrated memory 404 includes an operating system 414 and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the MAC OS, OS X, and/or iOS families of operating systems from APPLE CORPORATION, other operating systems, and the like.

The program modules 416 may include various software and/or program modules to perform the various operations described herein. The program modules 416 and/or other programs can be embodied in computer-readable media containing instructions that, when executed by the processing unit 402, perform various operations such as those described herein. According to embodiments, the program modules 416 may be embodied in hardware, software, firmware, or any combination thereof.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium," "computer-readable storage medium," and variations thereof does not include waves or signals per se and/or communication media, and therefore should be construed as being directed to "non-transitory" media only.

The user interface devices 406 may include one or more devices with which a user accesses the computer system 400. The user interface devices 406 may include, but are not limited to, computers, servers, PDAs, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer. In some embodiments, the I/O devices 408 can be used for manual controls for operations to exercise under certain emergency situations.

The network devices 410 enable the computer system 400 to communicate with other networks or remote systems via a network 418, such as the CMSP network 102 and the other network(s) 112. Examples of the network devices 410 include, but are not limited to, a modem, a radio frequency ("RF") or infrared ("IR") transceiver, a telephonic interface, a bridge, a router, or a network card. The network 418 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 418 may be or may include a wired network such as, but not limited to, a Wide Area Network ("WAN"), a wired Personal Area Network ("PAN"), or a wired Metropolitan Area Network ("MAN").

Figure 5:
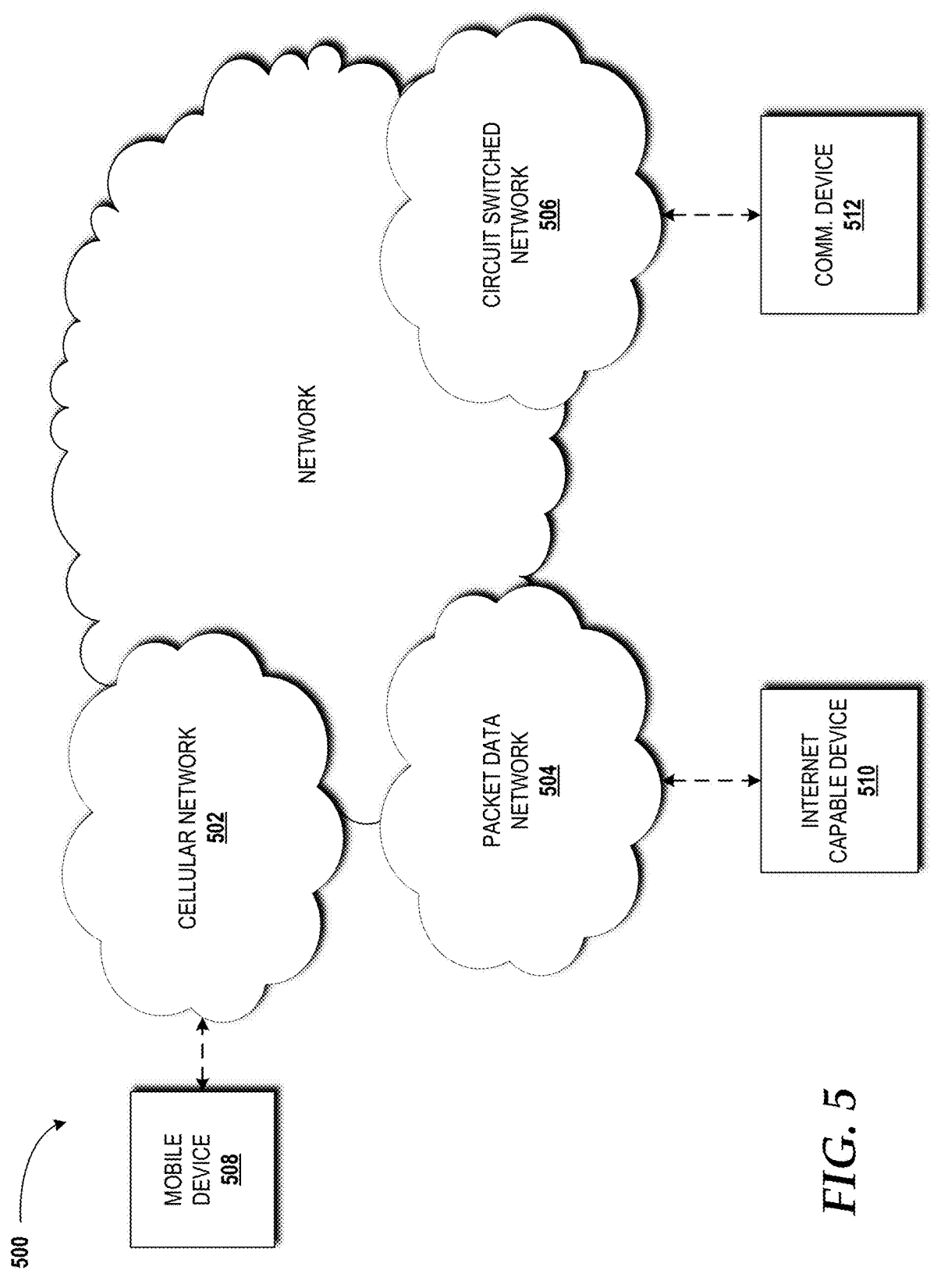
FIG. 5 is a diagram illustrating a network, according to an illustrative embodiment.

Turning now to FIG. 5, details of a network 500 are illustrated, according to an illustrative embodiment. In some embodiments, the network 500 can include the CMSP network 102 and the other network(s) 112. The illustrated network 500 includes a cellular network 502, a packet data network 504, for example, the Internet, and a circuit switched network 506, for example, a public switched telephone network ("PSTN"). The cellular network 502 includes various components such as, but not limited to, base transceiver stations ("BTSs"), NBs or eNBs, combination eNB/gNB, base station controllers ("BSCs"), radio network controllers ("RNCs"), mobile switching centers ("MSCs"), MMEs, short message service centers ("SMSCs"), multimedia messaging service centers ("MMSCs"), home location registers ("HLRs"), HSSs, VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, the WEA-capable device 108, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards such as LTE, or the like, as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 504 includes various hardware and software for providing circuit switched communications. The circuit switched network 506 may include, or may be, what is often referred to as a plain old telephone system ("POTS"). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network is used to refer broadly to any combination of the networks 502, 504, 506 shown in FIG. 5.

Figure 6:
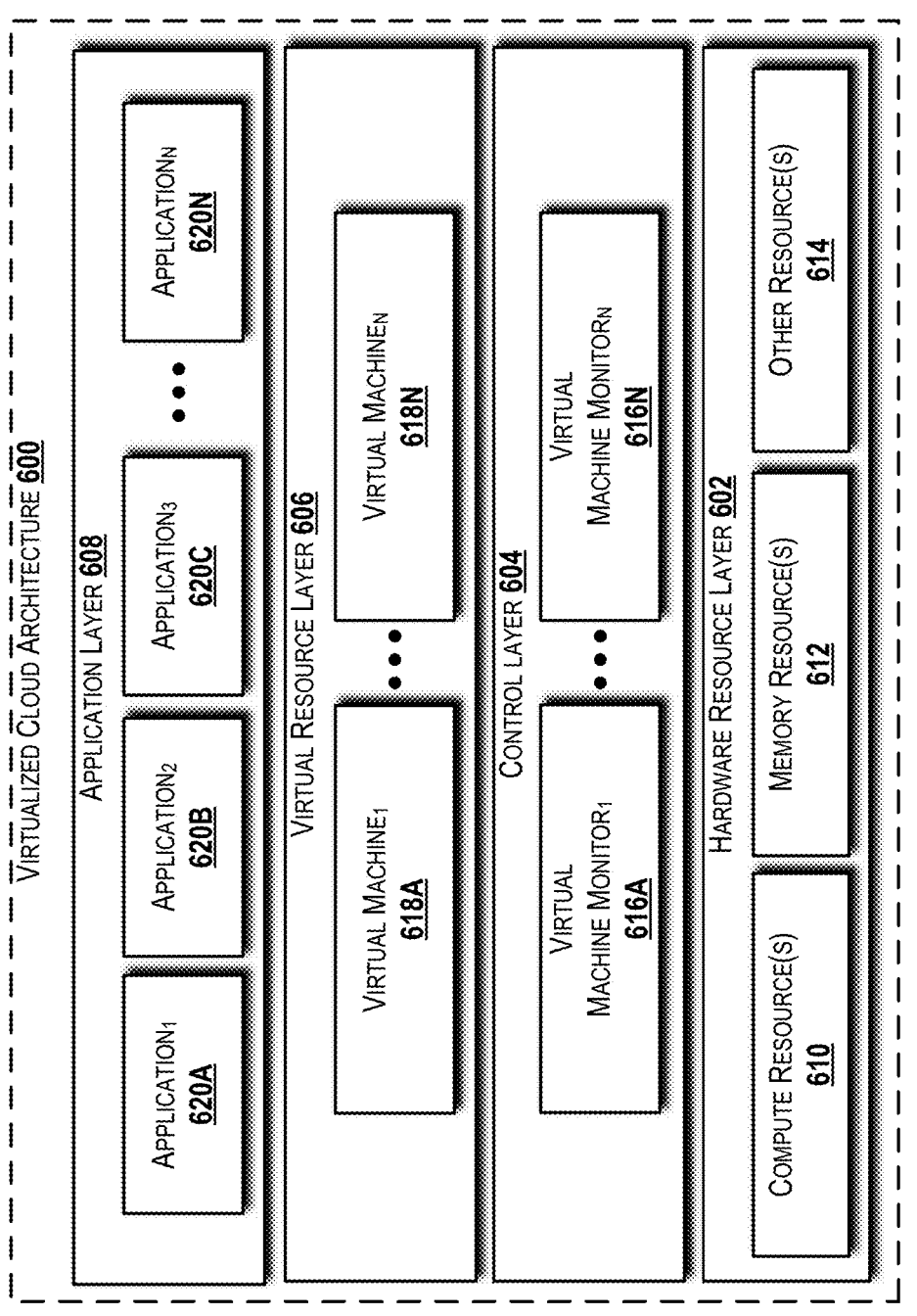
FIG. 6 is a diagram illustrating a virtualized cloud architecture capable of implementing aspects of the embodiments presented herein.

Turning now to FIG. 6, a block diagram illustrating an example virtualized cloud architecture 600 and components thereof will be described, according to an exemplary embodiment. In some embodiments, the virtualized cloud architecture 600 can be utilized to implement, at least in part, the CMSP network 102, the CMAS system 104, the CAP alert origination system 142, portions thereof, and/or combinations thereof. The virtualized cloud architecture 600 is a shared infrastructure that can support multiple services and network applications. The illustrated virtualized cloud architecture 600 includes a hardware resource layer 602, a control layer 604, a virtual resource layer 606, and an application layer 608 that work together to perform operations as will be described in detail herein.

The hardware resource layer 602 provides hardware resources, which, in the illustrated embodiment, include one or more compute resources 610, one or more memory resources 612, and one or more other resources 614. The compute resource(s) 610 can include one or more hardware components that perform computations to process data, and/or to execute computer-executable instructions of one or more application programs, operating systems, and/or other software. The compute resources 610 can include one or more central processing units ("CPUs") configured with one or more processing cores. The compute resources 610 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 610 can include one or more discrete GPUs. In some other embodiments, the compute resources 610 can include CPU and GPU components that are configured in accordance with a co-processing CPU/GPU computing model, wherein the sequential part of an application executes on the CPU and the computationally-intensive part is accelerated by the GPU. The compute resources 610 can include one or more system-on-chip ("SoC") components along with one or more other components, including, for example, one or more of the memory resources 612, and/or one or more of the other resources 614. In some embodiments, the compute resources 610 can be or can include one or more SNAPDRAGON SoCs, available from QUAL-COMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources 610 can be or can include one or more hardware components architected in accordance with an advanced reduced instruction set computing ("RISC") machine ("ARM") architecture, available for license from ARM HOLDINGS. Alternatively, the compute resources 610 can be or can include one or more hardware components architected in accordance with an x86 architecture, such an architecture available from INTEL CORPORATION of Mountain View, California, and others. Those skilled in the art will appreciate the implementation of the compute resources 610 can utilize various computation architectures, and as such, the compute resources 610 should not be construed as being limited to any particular computation architecture or combination of computation architectures, including those explicitly disclosed herein.

The memory resource(s) 612 can include one or more hardware components that perform storage operations, including temporary or permanent storage operations. In some embodiments, the memory resource(s) 612 include volatile and/or non-volatile memory implemented in any method or technology for storage of information such as computer-readable instructions, data structures, program modules, or other data disclosed herein.

Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 610.

The other resource(s) 614 can include any other hardware resources that can be utilized by the compute resources(s) 610 and/or the memory resource(s) 612 to perform operations described herein. The other resource(s) 614 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 602 can be virtualized by one or more virtual machine monitors ("VMMs") 616A-616N (also known as "hypervisors;" hereinafter "VMMs 616") operating within the control layer 604 to manage one or more virtual resources that reside in the virtual resource layer 606. The VMMs 616 can be or can include software, firmware, and/or hardware that alone or in combination with other software, firmware, and/or hardware, manages one or more virtual resources operating within the virtual resource layer 606.

The virtual resources operating within the virtual resource layer 606 can include abstractions of at least a portion of the compute resources 610, the memory resources 612, the other resources 614, or any combination thereof. These abstractions are referred to herein as virtual machines ("VMs"). In the illustrated embodiment, the virtual resource layer 606 includes VMs 618A-618N (hereinafter "VMs 618"). Each of the VMs 618 can execute one or more applications 620A-620N in the application layer 608.

Figure 7:
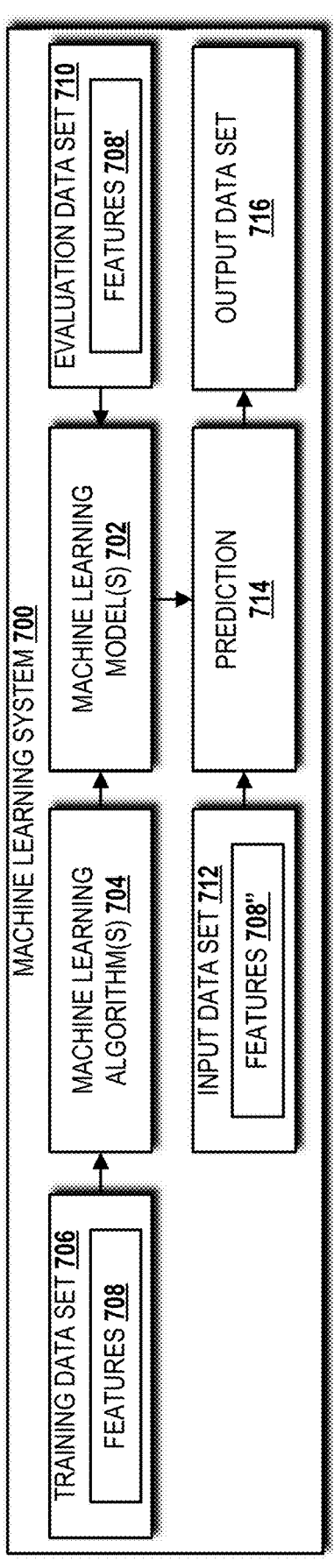
FIG. 7 is a diagram illustrating machine learning system capable of implementing aspects of the embodiments presented herein.

Turning now to FIG. 7, a machine learning system 700 capable of implementing aspects of the embodiments disclosed herein will be described. In some embodiments, the WEA application 114 can implement or otherwise utilize a machine learning system such as the machine learning system 700 to aid the user 124 in defining the WEA settings 128. For example, the machine learning system 700 can provide suggestions for the WEA settings 128 based upon how the user 124 uses the WEA-capable device 108. The illustrated machine learning system 700 includes one or more machine learning models 702. The machine learning models 702 can include supervised and/or semi-supervised learning models. The machine learning model(s) 702 can be created by the machine learning system 700 based upon one or more machine learning algorithms 704. The machine learning algorithm(s) 704 can be any existing, well-known algorithm, any proprietary algorithms, or any future machine learning algorithm. Some example machine learning algorithms 704 include, but are not limited to, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of various machine learning algorithms 704 based upon the problem(s) to be solved by machine learning via the machine learning system 700.

The machine learning system 700 can control the creation of the machine learning models 702 via one or more training parameters. In some embodiments, the training parameters are selected modelers at the direction of an enterprise, for example. Alternatively, in some embodiments, the training parameters are automatically selected based upon data provided in one or more training data sets 706. The training parameters can include, for example, a learning rate, a model size, a number of training passes, data shuffling, regularization, and/or other training parameters known to those skilled in the art.

The learning rate is a training parameter defined by a constant value. The learning rate affects the speed at which the machine learning algorithm 704 converges to the optimal weights. The machine learning algorithm 704 can update the weights for every data example included in the training data set 706. The size of an update is controlled by the learning rate. A learning rate that is too high might prevent the machine learning algorithm 704 from converging to the optimal weights. A learning rate that is too low might result in the machine learning algorithm 704 requiring multiple training passes to converge to the optimal weights.

The model size is regulated by the number of input features ("features") 706 in the training data set 706. A greater the number of features 708 yields a greater number of possible patterns that can be determined from the training data set 706. The model size should be selected to balance the resources (e.g., compute, memory, storage, etc.) needed for training and the predictive power of the resultant machine learning model 702.

The number of training passes indicates the number of training passes that the machine learning algorithm 704 makes over the training data set 706 during the training process. The number of training passes can be adjusted based, for example, on the size of the training data set 706, with larger training data sets being exposed to fewer training passes in consideration of time and/or resource utilization. The effectiveness of the resultant machine learning model 702 can be increased by multiple training passes.

Data shuffling is a training parameter designed to prevent the machine learning algorithm 704 from reaching false optimal weights due to the order in which data contained in the training data set 706 is processed. For example, data provided in rows and columns might be analyzed first row, second row, third row, etc., and thus an optimal weight might be obtained well before a full range of data has been considered. By data shuffling, the data contained in the training data set 706 can be analyzed more thoroughly and mitigate bias in the resultant machine learning model 702.

Regularization is a training parameter that helps to prevent the machine learning model 702 from memorizing training data from the training data set 706. In other words, the machine learning model 702 fits the training data set 706, but the predictive performance of the machine learning model 702 is not acceptable. Regularization helps the machine learning system 700 avoid this overfitting/memorization problem by adjusting extreme weight values of the features 708. For example, a feature that has a small weight value relative to the weight values of the other features in the training data set 706 can be adjusted to zero.

The machine learning system 700 can determine model accuracy after training by using one or more evaluation data sets 710 containing the same features 708' as the features 708 in the training data set 706. This also prevents the machine learning model 702 from simply memorizing the data contained in the training data set 706. The number of evaluation passes made by the machine learning system 700 can be regulated by a target model accuracy that, when reached, ends the evaluation process and the machine learning model 702 is considered ready for deployment.

After deployment, the machine learning model 702 can perform a prediction operation ("prediction") 714 with an input data set 712 having the same features 708" as the features 708 in the training data set 706 and the features 708' of the evaluation data set 710. The results of the prediction 714 are included in an output data set 716 consisting of predicted data. The machine learning model 702 can perform other operations, such as regression, classification, and others. As such, the example illustrated in FIG. 7 should not be construed as being limiting in any way.

Based on the foregoing, it should be appreciated that concepts and technologies directed to adaptive user-controllable event level WEA opt-out and soft presentation have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:

presenting, via a wireless emergency alert-capable device comprising a light sensor, a motion sensor, and a processor executing a wireless emergency alert application, a user interface through which a user defines a wireless emergency alert setting for a type of wireless emergency alert based on outputs from the light sensor and the motion sensor, wherein the wireless emergency alert setting changes how wireless emergency alerts determined to be the type of wireless emergency alert are presented to the user when an output from the light sensor of the wireless emergency alert-capable device corresponds to darkness and an output from the motion sensor of the wireless emergency alert-capable device corresponds to the wireless emergency alert-capable device being stationary;

receiving, by the wireless emergency alert-capable device, a wireless emergency alert;

in response to receiving the wireless emergency alert, determining whether the wireless emergency alert is the type of wireless emergency alert associated with the wireless emergency alert setting;

in response to determining that the wireless emergency alert is the type of wireless emergency alert associated with the wireless emergency alert setting, determining whether the output of the light sensor corresponds to darkness and the output from the motion sensor corresponds to the wireless emergency alert-capable device being stationary; and in response to determining that the output of the light sensor corresponds to darkness and the output from the motion sensor corresponds to the wireless emergency alert-capable device being stationary, presenting, by the wireless emergency alert-capable device, the wireless emergency alert to the user in accordance with the wireless emergency alert setting, wherein presenting the wireless emergency alert to the user in accordance with the wireless emergency alert setting comprises presenting the wireless emergency alert without any sound or vibration.

2. The method of claim 1, wherein the wireless emergency alert setting changes how the wireless emergency alert is presented to the user further based upon a time.

3. The method of claim 1, further comprising in response to determining that the wireless emergency alert is not the type of wireless emergency alert associated with the wireless emergency alert setting, presenting the wireless emergency alert in accordance with a normal wireless emergency alert presentation.

4. The method of claim 1, further comprising in response to determining that the output of the light sensor does not correspond to darkness or the output from the motion sensor does not correspond to the wireless emergency alert-capable device being stationary, presenting the wireless emergency alert in accordance with the wireless emergency alert setting.

5. The method of claim 1, further comprising in response to determining that the output of the light sensor does not correspond to darkness and the output from the motion sensor does not correspond to the wireless emergency alert-capable device being stationary, presenting the wireless emergency alert in accordance with the wireless emergency alert setting.

6. The method of claim 1, wherein the wireless emergency alert setting is selected from a plurality of pre-defined emergency alert settings.

7. The method of claim 6, wherein each of the plurality of pre-defined emergency alert settings comprises a percentage reduction of a volume setting, a percentage reduction of an intensity of vibration setting, or a percentage reduction of both the volume setting and the intensity of vibration setting.

8. A wireless emergency alert-capable device comprising:
a light sensor;
a motion sensor;
a processor; and
a memory comprising instructions for a wireless emergency alert application that, when executed by the processor, cause the processor to perform operations comprising
presenting a user interface through which a user defines a wireless emergency alert setting for a type of wireless emergency alert based on outputs from the light sensor and the motion sensor, wherein the wireless emergency alert setting changes how wireless emergency alerts determined to be the type of wireless emergency alert are presented to the user when an output from the light sensor of the wireless emergency alert-capable device corresponds to darkness and an output from the motion sensor of the wireless emergency alert-capable device corresponds to the wireless emergency alert-capable device being stationary,
receiving a wireless emergency alert,
in response to receiving the wireless emergency alert, determining whether the wireless emergency alert is the type of wireless emergency alert associated with the wireless emergency alert setting,
in response to determining that the wireless emergency alert is the type of wireless emergency alert associated with the wireless emergency alert setting, determining whether the output of the light sensor corresponds to darkness and the output from the motion sensor corresponds to the wireless emergency alert-capable device being stationary, and
in response to determining that the output of the light sensor corresponds to darkness and the output from the motion sensor corresponds to the wireless emergency alert-capable device being stationary, presenting the wireless emergency alert to the user in accordance with the wireless emergency alert setting, wherein presenting the wireless emergency alert to the user in accordance with the wireless emergency alert setting comprises presenting the wireless emergency alert without any sound or vibration.

9. The wireless emergency alert-capable device of claim 8, wherein the wireless emergency alert setting changes how the wireless emergency alert is presented to the user further based upon a time.

10. The wireless emergency alert-capable device of claim 8, wherein the operations further comprise in response to determining that the wireless emergency alert is not the type of wireless emergency alert associated with the wireless emergency alert setting, presenting the wireless emergency alert in accordance with a normal wireless emergency alert presentation.

11. The wireless emergency alert-capable device of claim 8, wherein the operations further comprise in response to determining that the output of the light sensor does not correspond to darkness or the output from the motion sensor does not correspond to the wireless emergency alert-capable device being stationary, presenting the wireless emergency alert in accordance with the wireless emergency alert setting.

12. The wireless emergency alert-capable device of claim 11, wherein the operations further comprise in response to determining that the output of the light sensor does not correspond to darkness and the output from the motion sensor does not correspond to the wireless emergency alert-capable device being stationary, presenting the wireless emergency alert in accordance with the wireless emergency alert setting.

13. The wireless emergency alert-capable device of claim 8, wherein the wireless emergency alert setting is selected from a plurality of pre-defined emergency alert settings.

14. The wireless emergency alert-capable device of claim 13, wherein each of the plurality of pre-defined emergency alert settings comprises a percentage reduction of a volume setting, a percentage reduction of an intensity of vibration setting, or a percentage reduction of both the volume setting and the intensity of vibration setting.

15. A computer-readable storage medium comprising computer-executable instructions for a wireless emergency alert application that, when executed by a processor of a wireless emergency alert-capable device comprising a light sensor and a motion sensor, cause the processor to perform operations comprising:
presenting a user interface through which a user defines a wireless emergency alert setting for a type of wireless emergency alert based on outputs from the light sensor and the motion sensor, wherein the wireless emergency alert setting changes how wireless emergency alerts determined to be the type of wireless emergency alert are presented to the user when an output from the light sensor of the wireless emergency alert-capable device corresponds to darkness and an output from the motion sensor of the wireless emergency alert-capable device corresponds to the wireless emergency alert-capable device being stationary;

receiving a wireless emergency alert;

in response to receiving the wireless emergency alert, determining whether the wireless emergency alert is the type of wireless emergency alert associated with the wireless emergency alert setting;

in response to determining that the wireless emergency alert is the type of wireless emergency alert associated with the wireless emergency alert setting, determining whether the output of the light sensor corresponds to darkness and the output from the motion sensor corresponds to the wireless emergency alert-capable device being stationary; and in response to determining that the output of the light sensor corresponds to darkness and the output from the motion sensor corresponds to the wireless emergency alert-capable device being stationary, presenting the wireless emergency alert to the user in accordance with the wireless emergency alert setting, wherein presenting the wireless emergency alert to the user in accordance with the wireless emergency alert setting comprises presenting the wireless emergency alert without any sound or vibration.

16. The computer-readable storage medium of claim 15, wherein the wireless emergency alert setting changes how the wireless emergency alert is presented to the user further based upon a time.

17. The computer-readable storage medium of claim 15, wherein the operations further comprise in response to determining that the wireless emergency alert is not the type of wireless emergency alert associated with the wireless emergency alert setting, presenting the wireless emergency alert in accordance with a normal wireless emergency alert presentation.

18. The computer-readable storage medium of claim 15, wherein the operations further comprise in response to determining that the output of the light sensor does not correspond to darkness or the output from the motion sensor does not correspond to the wireless emergency alert-capable device being stationary, presenting the wireless emergency alert in accordance with the wireless emergency alert setting.

19. The computer-readable storage medium of claim 18, wherein the operations further comprise in response to determining that the output of the light sensor does not correspond to darkness and the output from the motion sensor does not correspond to the wireless emergency alert-capable device being stationary, presenting the wireless emergency alert in accordance with the wireless emergency alert setting.

20. The computer-readable storage medium of claim 15, wherein the wireless emergency alert setting is selected from a plurality of pre-defined emergency alert settings, and wherein each of the plurality of pre-defined emergency alert settings comprises a percentage reduction of a volume setting, a percentage reduction of an intensity of vibration setting, or a percentage reduction of both the volume setting and the intensity of vibration setting.

* * * * *